Patented Sept. 30, 1941

2,257,667

UNITED STATES PATENT OFFICE 2,257,667

LUMINESCENT MATERIAL

Gunther Aschermann, Berlin-Charlottenburg, Germany, assignor to General Electric Company, a corporation of New York No Drawing. Application September 4, 1940, Serial No. 355,408. In Germany July 14, 1939

8 Claims. (Cl. 250—81)

The present invention relates to luminescent materials generally, and more particularly the invention relates to such materials which are excited to luminescence by radiation.

The object of the invention is to provide a luminescent material having its main emission in the spectral region between 2900 and 4800 Angstrom units under excitation by radiation. Another object of the invention is to provide a luminescent material having a substantial emission of near ultra violet radiation. Still further objects and advantages of the invention will be apparent to those skilled in the art from the following detailed description thereof and from the appended claims.

Because of their high light output, their chemical stability, and the simplicity with which they can be produced, the luminescent silicates, especially manganese-activated zinc silicates, have proved to be eminently desirable for use in conjunction with discharge lamps. The green or yellow-green color of the light emitted by these silicates may be changed either by special treatment or by suitable additions. For instance in the case of manganese-activated zinc silicates, a part of the zinc oxide is replaced by beryllium oxide, when desired, to displace the color of the emitted light towards the yellow and yellow-red part of the spectrum. Heretofore, no noticeable displacement of the wave length of the emitted light toward the short-wave part of the spectrum has been attained.

We have discovered that luminescent silicates which radiate blue or ultra violet light at high intensity are produced when ortho- or meta-silicates of beryllium, magnesium or aluminum are activated singly or in mixtures by means of thallium. In order to produce such silicates, silicic acid in its purest form is mixed with the purest oxides of beryllium, magnesium or aluminum, or mixtures of the latter in proportions ranging between 1 to 1 and 1 to 2. In such mixtures the proportionality between the component parts need not correspond to the stoichiometrical ratios. The mixtures are treated with thallium salts or solutions of thallium salts, and are then heated to a glowing temperature. The quantity of added thallium salts may vary within wide limits and may amount to 30 per cent by weight. Preferably the material is heated to a temperature between 800 and 1200° C., but the duration of the treatment at such elevated temperatures should be shorter than at the lower temperatures. Temperatures which are higher than 1200° C. are not desirable because of the noticeable evaporation of thallium which then takes place.

The emission of the new luminescent material ranges mainly between 2900 to 4800 Angstrom units and has in addition a slight band in the yellow spectral range. For this reason, the material is not only useful for the modification of the color and for increasing the amount of the visible light yielded by a mercury vapor discharge lamp, but also for increasing the output of photochemically active rays of such lamps. The material is useful for transforming the 2537 Angstrom line of the mercury low-pressure discharge into ultra violet light of longer wave length.

The silicic acid in the materials described above can be replaced partly or entirely by germanium dioxide, when desired, as in the case of the manganese-activated luminescent silicates. This substitution does not noticeably affect the properties of the material.

In many cases, it has been found advantageous to melt the mixture in order to obtain a homogeneous distribution of the individual constituents. To obtain fusion at a temperature at which the thallium, which is used as an activator, does not evaporate, it is advisable to admix with the mixture calcuim fluoride as a flux, and in quantities up to about 30 per cent. It is surprising to note that such an addition will increase the light output of the material to a considerable extent. An addition of about 10 per cent calcium fluoride is preferred for then the fusion temperature of the mixture lies between 1100 and 1200° C. and the light output of the material is about 30 per cent higher than without the calcium fluoride addition.

Since the luminescent material of the present invention is highly responsive to ultra violet light having a wave length of 2537 Angstrom units, it is useful in conjunction with any device capable of generating light of this wave length. A low pressure, mercury vapor, electric lamp of the diffuse, positive column discharge type having a substantial output of visible light also emits rays of the desired wave length at strong intensity and the new luminescent material is particularly useful, therefore, in conjunction with lamps of this type. Such lamps are now available commercially and comprise an elongated, tubular container of vitreous material having electrodes sealed therein adjacent the ends thereof and usually contain a starting gas, such as argon or neon, at a pressure of about 1 to 10 mm. Cold, sheet metal electrodes or activated electrodes of the cold or hot type are used in such lamps. When the container consists of a glass which does not transmit the ultra violet rays to which the luminescent material is highly responsive, but which does transmit rays emitted by the luminescent silicate, we prefer to mount the silicate in the interior of the container and preferably as a thin layer of powder on the inner surface thereof. When the container consists of a material, such as quartz, which transmits the exciting radiation, the luminescent material is mounted either inside the container or outside the container in such position that the exciting radiation emitted by the discharge impinges thereon.

What I claim as new and desire to secure by Letters Patent of the United States is:

1. A method of producing a thallium activated luminescent compound which comprises the steps of mixing a pure material from the group consisting of germanium dioxide and silicic acid with the pure oxide of a metal from the group consisting of beryllium, magnesium and aluminium in proportions ranging between 1 to 1 and 1 to 2, adding thereto a thallium salt in an amount up to about 30 per cent by weight and heating to a temperature between 800 and 1200° C.

2. A method of producing a thallium activated luminescent compound which comprises the steps of mixing a pure material from the group consisting of germanium dioxide and silicic acid with the pure oxide of a metal from the group consisting of beryllium, magnesium and aluminium in proportions ranging between 1 to 1 and 1 to 2, adding thereto a thallium salt in an amount up to about 30 per cent by weight and calcium fluoride in an amount up to about 30 per cent by weight and heating to a temperature between 800 and 1200° C.

3. A method of producing a thallium activated luminescent compound which comprises the steps of mixing a pure material from the group consisting of germanium dioxide and silicic acid with the pure oxide of a metal from the group consisting of beryllium, magnesium and aluminium in proportions ranging between 1 to 1 and 1 to 2, adding thereto a thallium salt in an amount up to about 30 per cent by weight and about 10 per cent by weight of calcium fluoride and heating to a temperature between 1100 and 1200° C.

4. A luminescent substance highly responsive to ultraviolet light having a wave length of 2537 Angstrom units and highly emissive in the range between 2900 to 4800 Angstrom units, said substance comprising thallium as an activator and a material from the group consisting of the germanates and silicates of a metal from the group consisting of beryllium, magnesium and aluminum.

5. A method of producing a thallium activated luminescent compound which comprises the steps of mixing a pure material from the group consisting of germanium dioxide and silicic acid with the pure oxide of a metal from the group consisting of beryllium, magnesium and aluminum in proportions ranging between 1 to 1 and 1 to 2, adding thereto a thallium salt in an amount up to about 30 per cent by weight and heating to a glowing temperature.

6. A luminescent material comprising a thallium activated beryllium silicate.

7. A luminescent material comprising a thallium activated magnesium silicate.

8. A luminescent material comprising a thallium activated aluminum silicate.

GUNTHER ASCHERMANN.